US012652213B2

(12) United States Patent     (10) Patent No.: US 12,652,213 B2
Sun et al.     (45) Date of Patent:    Jun. 9, 2026

(54) SYSTEMS AND METHODS FOR ERROR CODE ANALYTICS IN TELECOMMUNICATIONS NETWORKS

(71) Applicant: NetScout Systems, Inc., Westford, MA (US)

(72) Inventors: Quenie Sun, Westford, MA (US); Erdem Uysal, Westford, MA (US); Steve Loker, Westford, MA (US); Greg Mayo, Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 72 days.

(21) Appl. No.: 18/478,883

(22) Filed: Sep. 29, 2023

(65) Prior Publication Data

US 2025/0112815 A1    Apr. 3, 2025

(51) Int. Cl.
   *H04L 41/0631*     (2022.01)
   *H04L 1/00*       (2006.01)

(52) U.S. Cl.
   CPC ........ *H04L 41/0631* (2013.01); *H04L 1/0061* (2013.01)

(58) Field of Classification Search
   CPC .......................... H04L 41/0631; H04L 1/0061
   See application file for complete search history.

(56) References Cited

U.S. PATENT DOCUMENTS

| | | | | |
|---|---|---|---|---|
| 8,140,358 B1* | 3/2012 | Ling | ..................... | G07C 5/008 |
| | | | | 340/439 |
| 9,104,611 B1* | 8/2015 | Bertz | ................... | G06F 11/076 |
| 9,183,072 B1* | 11/2015 | Makuch | .............. | G06F 11/0709 |
| 10,346,737 B1* | 7/2019 | Benitez | ................... | G06N 3/08 |
| 10,402,255 B1* | 9/2019 | Niyogi | ................. | G06F 11/079 |
| 11,237,736 B1* | 2/2022 | Cai | ....................... | G06F 3/0659 |
| 11,281,521 B1* | 3/2022 | Petkar | ................ | G06F 11/0751 |
| 11,551,486 B1* | 1/2023 | Everett | ............... | G07C 5/0858 |
| 2002/0019870 A1* | 2/2002 | Chirashnya | ........... | H04L 41/142 |
| | | | | 709/224 |
| 2005/0015644 A1* | 1/2005 | Chu | ..................... | H04L 41/069 |
| | | | | 714/4.1 |
| 2006/0064291 A1* | 3/2006 | Pattipatti | ........... | G05B 23/0251 |
| | | | | 703/14 |
| 2011/0231703 A1* | 9/2011 | Pargellis | ........... | G05B 23/0281 |
| | | | | 714/E11.029 |
| 2015/0019916 A1* | 1/2015 | Kane | ................... | G06F 11/0766 |
| | | | | 714/39 |
| 2015/0082130 A1* | 3/2015 | Dunne | ................. | H04L 1/0009 |
| | | | | 714/776 |

(Continued)

*Primary Examiner* — Abdelbasst Talioua
(74) *Attorney, Agent, or Firm* — Foley & Lardner LLP

(57) ABSTRACT

A system and method for analyzing error codes includes detecting a failure condition on a network, identifying a subset of subscribers impacted by the failure condition, determining for each subscriber in the subset of subscribers a first set of error codes associated with the failure condition, creating a Bayesian network comprising one or more error codes from the first set of error codes of each the subset of subscribers, computing a Conditional Probability Distribution (CPD) for each of the one or more error codes of the Bayesian network, and determining a second set of error codes based on the CPD, the second set of error codes indicative of a cause of the failure condition.

16 Claims, 8 Drawing Sheets

200

205 → Detect failure condition

210 → Identify subset of subscribers impacted by the failure condition

215 → For each subscriber, identify first set of error codes for the failure condition 220 → Create Bayesian Network having one or more error codes from the first set of error codes of each subscriber 225 → Update the created Bayesian Network 230 → Compute a Conditional Probability Distribution (CPD) for each of the one or more error codes used in the Bayesian Network 235 → Determine a second set of error codes based on the CPD, the second set of error codes indicative of a cause of the failure condition 240 → Generate a message based on the second set of error codes

(56) References Cited

U.S. PATENT DOCUMENTS

| | | | | |
|---|---|---|---|---|
| 2016/0012237 | A1* | 1/2016 | Eftekhari | H04L 9/004 |
| | | | | 713/189 |
| 2016/0246686 | A1* | 8/2016 | Sakata | G06F 11/1456 |
| 2016/0300036 | A1* | 10/2016 | Ramazzotti | G16H 50/70 |
| 2016/0342451 | A1* | 11/2016 | Ly | G06F 11/0739 |
| 2017/0163353 | A1* | 6/2017 | Chen | H04B 13/02 |
| 2017/0286208 | A1* | 10/2017 | Hives | G06F 11/0793 |
| 2017/0364819 | A1* | 12/2017 | Yang | H04L 41/16 |
| 2018/0309616 | A1* | 10/2018 | Kollipara | H04W 24/08 |
| 2019/0188070 | A1* | 6/2019 | Das | G06F 11/0706 |
| 2020/0119971 | A1* | 4/2020 | Healey | G06F 11/0709 |
| 2020/0351270 | A1* | 11/2020 | Burton | H04L 63/0227 |
| 2021/0044679 | A1* | 2/2021 | Caulfield | H04L 1/0089 |
| 2021/0103487 | A1* | 4/2021 | Rosales | G06N 7/01 |
| 2021/0117868 | A1* | 4/2021 | Sriharsha | G06N 20/20 |
| 2021/0135720 | A1* | 5/2021 | Zhang | H04B 7/0469 |
| 2021/0359768 | A1* | 11/2021 | Post | H04J 13/0048 |
| 2022/0070691 | A1* | 3/2022 | Ahmed | G06F 11/3688 |
| 2022/0093279 | A1* | 3/2022 | Marinescu | G16Y 40/20 |
| 2022/0138504 | A1* | 5/2022 | Fathi Moghadam | G06F 18/23 |
| | | | | 706/12 |
| 2022/0191647 | A1* | 6/2022 | Zohoorian | H04W 4/029 |
| 2022/0237456 | A1* | 7/2022 | Belfiore | G06N 3/08 |
| 2023/0054912 | A1* | 2/2023 | Dixit J | G06V 30/19 |
| 2023/0083876 | A1* | 3/2023 | Okimoto | G06Q 50/04 |
| | | | | 706/11 |
| 2023/0171561 | A1* | 6/2023 | Zohoorian | H04W 4/026 |
| | | | | 455/456.5 |
| 2023/0308209 | A1* | 9/2023 | Newman | H03M 13/6597 |
| 2023/0409251 | A1* | 12/2023 | Wushour | G06F 3/1261 |
| 2024/0179048 | A1* | 5/2024 | Mishra | G06F 11/0709 |
| 2024/0179080 | A1* | 5/2024 | Kimura | H04L 41/5074 |
| 2024/0187159 | A1* | 6/2024 | Petkar | H04W 24/08 |
| 2024/0202023 | A1* | 6/2024 | Nandakumaran | G06F 11/1402 |
| 2025/0070798 | A1* | 2/2025 | Ji | H03M 13/036 |

* cited by examiner

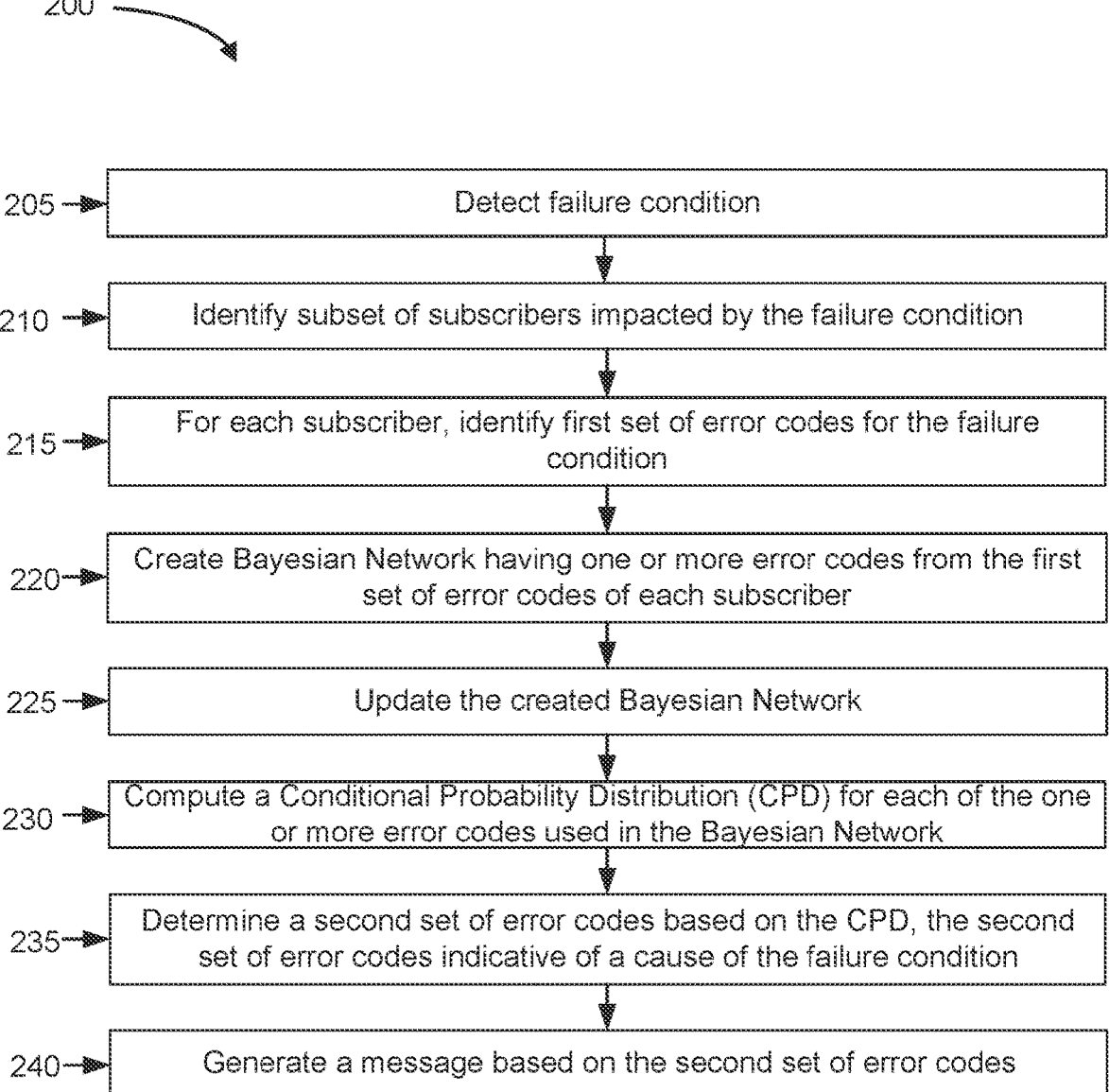

200

205 → Detect failure condition

210 → Identify subset of subscribers impacted by the failure condition

215 → For each subscriber, identify first set of error codes for the failure condition 220 → Create Bayesian Network having one or more error codes from the first set of error codes of each subscriber 225 → Update the created Bayesian Network 230 → Compute a Conditional Probability Distribution (CPD) for each of the one or more error codes used in the Bayesian Network 235 → Determine a second set of error codes based on the CPD, the second set of error codes indicative of a cause of the failure condition 240 → Generate a message based on the second set of error codes

FIG. 2

| | EC1 | EC2 | EC3 | EC4 | EC5 | EC6 |
|---|---|---|---|---|---|---|
| EC1 | x 405 | x 435 | x 440 | | x 450 | x 460 |
| EC2 | | x 410 | | x 445 | | x 465 |
| EC3 | | | x 415 | | x 455 | |
| EC4 | | | | x 420 | | x 470 |
| EC5 | | | | | x 425 | |
| EC6 | | | | | | x 430 |

400

500 →

| CPD of EC1 | |
|---|---|
| EC1(0) <u>535</u> | 0.83 |
| EC1(1) <u>530</u> | 0.17 |

505 →

| CPD of EC2 | | |
|---|---|---|
| EC1 | EC1(0) | EC1(1) |
| EC2(0) | 0.8 | 0 |
| EC2(1) | 0.2 | 1 |

510 →

| CPD of EC3 | | |
|---|---|---|
| EC1 | EC1(0) | EC1(1) |
| EC3(0) | 0.8 | 0 |
| EC3(1) | 0.2 | 1 |

515 →

| CPD of EC4 | | |
|---|---|---|
| EC2 | EC2(0) | EC2(1) |
| EC4(0) | 0.75 | 0.5 |
| EC4(1) | 0.25 | 0.5 |

520 →

| CPD of EC5 | | |
|---|---|---|
| EC3 | EC3(0) | EC3(1) |
| EC5(0) | 0.75 | 0.5 |
| EC5(1) | 0.25 | 0.5 |

525 →

| CPD of EC6 | | | | |
|---|---|---|---|---|
| EC2 | EC2(0) | EC2(0) | EC2(1) | EC2(1) |
| EC4 | EC4(0) | EC4(1) | EC4(0) | EC4(1) |
| EC6(0) | 0.67 | 0 | 1 | 1 |
| EC6(1) | 0.33 | 1 | 0 | 0 |

SYSTEMS AND METHODS FOR ERROR CODE ANALYTICS IN TELECOMMUNICATIONS NETWORKS

BACKGROUND

Digital services may be provided by servers to client devices via a telecommunications network (also referred to herein as a "network"). For example, servers may provide audio, video, or other digital services across mobile, fixed-line, cable, and enterprise communication networks using technology such as Voice Over Long-Term Evolution (VOLTE), Voice Over Internet Protocol (VOIP), Over-The-Top (OTT), etc. On some occasions, normal communication services may be degraded or disrupted. Quickly identifying and resolving the cause of the degradation or disruption to resume normal operations may be desirable.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is an example flow chart outlining operations of a process for performing error code analytics in the system of FIG. 1.

DETAILED DESCRIPTION

Figure 1:
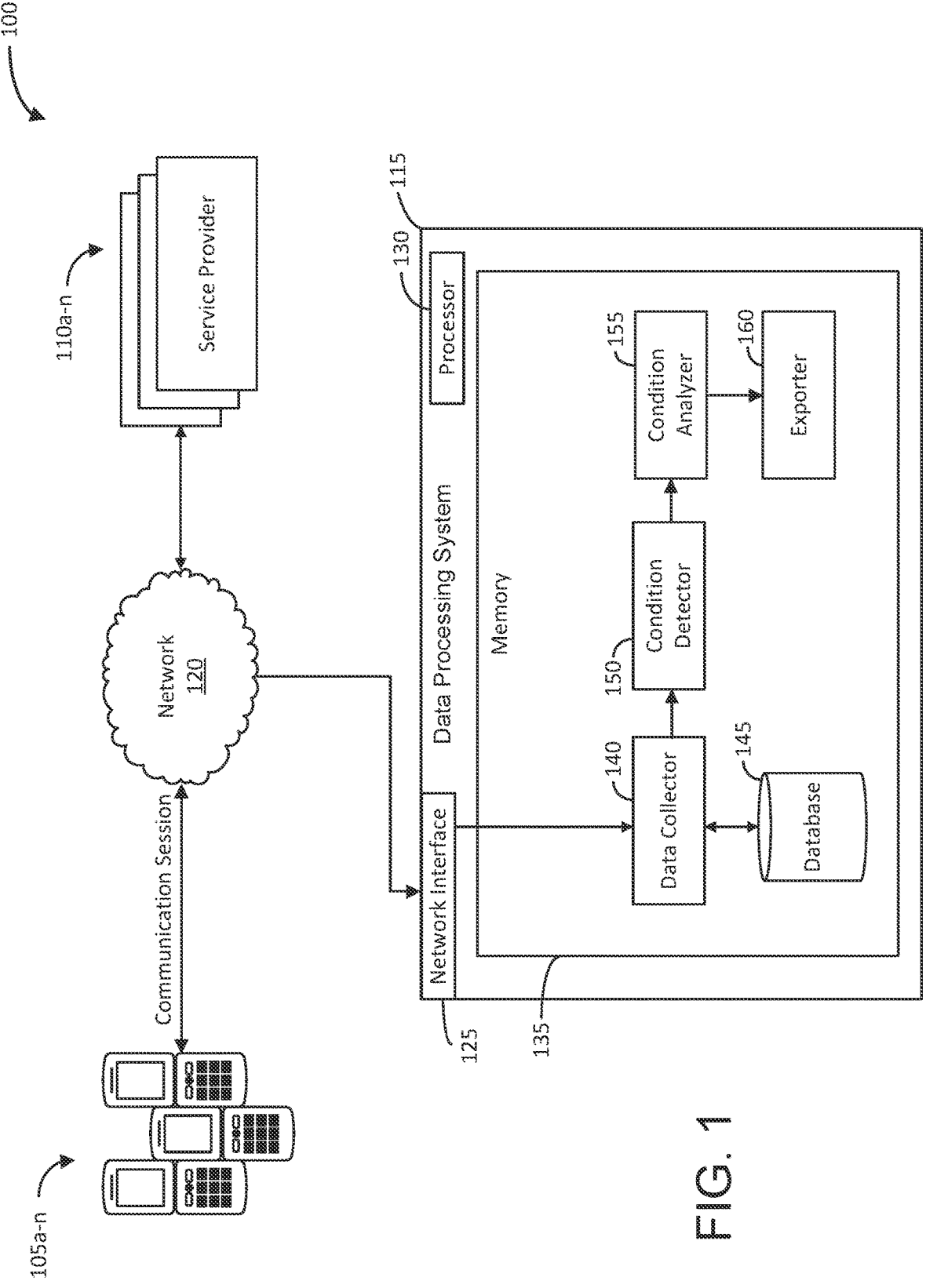
FIG. 1 is an example block diagram of a system for error code analytics in telecommunications networks.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

In control plane protocols, occasionally communications between two devices may be disrupted or degraded leading to a failure condition. Such failure conditions (also referred to herein as error conditions) may be represented by error codes. By looking at the error codes, the type of the failure condition may be determined. Each control plane protocol may define its own set of error codes. Each type of network interface may also define its own set of error codes. In today's service provider network, to service a single request, multiple control plane protocols may be involved. Messages carrying these control plane protocols may traverse multiple network interfaces, resulting in hundreds of data packets. When a failure condition occurs, identifying error codes occurred in all control plane protocols involved, on each network interface involved, may help service provider pinpoint root cause of the failure condition quickly.

However, because different control plane protocols and different network interfaces have different error codes, analyzing these error codes to determine the root cause of the problem may be challenging. Analyzing error codes effectively may require domain knowledge to identify what error codes, in which control plane protocols, on what network interfaces to look for. When domain knowledge does not cover new control plane protocols or network interfaces, valuable insights may be missed. When domain knowledge has outdated or redundant rules, computation resources may be wasted.

Thus, the present disclosure provides a mechanism to effectively, quickly, and reliably analyze error codes to determine the root cause of a failure condition. In particular, the present disclosure provides a solution that employs correlation coefficients and Bayesian networks to dynamically discover causation relationships among error codes in multiple control plane protocols on different network interfaces. By identifying causation relationships, the present disclosure may quickly discover situations in which an error code may be caused by the occurrence of another error code. For example, if an error code EC1 is causing an error code EC2, resolving the problem associated with the error code EC2 may not be sufficient until the problem associated with the error code EC1 is also resolved. On the other hand, if it is known that the error code EC1 is causing the error code EC2, then by resolving the problem that is causing the error code EC1, the problem associated with the error code EC2 may automatically be resolved or at least mitigated. Thus, the present disclosure provides a dynamic solution to identify causation relationships between error codes agnostic to control plane protocols and network interfaces and use the causation relationships to determine the root cause of a failure condition.

FIG. 1 illustrates an example system 100 for error code analytics in telecommunications networks. The system 100 may provide for improved identification of causes of failure conditions in the telecommunications network. In particular, the system 100 may provide for improved identification of error codes indicative of a cause of a failure condition in the telecommunications network. The system 100 may include, access, or otherwise interface with one or more client devices 105a-n (hereinafter client device 105 or client devices 105), service providers 110a-n (hereinafter service provider 110 or service providers 110), and data processing system 115 that communicate via a network 120.

Each of the client devices 105 may be a user device such as a laptop, desktop, tablet, personal digital assistant, smart phone, portable computers, wearable device, speaker, or other devices or gadgets that may be used by a user to establish communication over the network 120. Each of the client devices 105 may include or execute application(s) to receive data from, and send data to, the service providers 110. For example, one or more of the client devices 105 may execute a video application upon receiving a user input selection that causes the client devices to open the video application on a display associated with the client devices. Responsive to executing the video application, the service provider 110 associated with the video application may stream a requested video to the client devices 105 in a communication session. In another example, one or more of the client devices 105 may execute a video game application. Responsive to executing the video game application, the service provider 110 associated with the video game application may provide data for the video game application to the client devices 105. The client devices 105 may establish communication sessions with the service providers 110 for any type of application or for any type of call or communication.

Each of the client devices 105 may be located or deployed at any geographic location in the network environment depicted in FIG. 1. Each of the client devices 105 may be deployed, for example, at a geographic location where a typical user using a respective client device may seek to connect to a network (e.g., access a browser or another application that requires communication across a network). For example, a user may use the client device 105 to access the Internet at home, as a passenger in a car, while riding a bus, in the park, at work, while eating at a restaurant, or in any other environment. The client device 105 may be deployed at a separate site, such as an availability zone managed by a public cloud provider. If the client device 105 is deployed in a cloud environment, the client device may include or be referred to as a virtual client device or virtual machine. In the event the client device 105 is deployed in a cloud environment, the packets exchanged between the client device and the service providers 110 may still be retrieved by the data processing system 115 from the network 120. In some cases, the client devices 105 and/or the data processing system 115 may be deployed in the cloud environment on the same computing host in an infrastructure.

The service providers 110 may each be or include servers or computers configured to transmit or provide services across the network 120 to one or more of the client devices 105. For example, the service providers 110 may each include a set of one or more servers, depicted in FIG. 6A, or a data center, also depicted in 6A. The service providers 110 may transmit or provide such services upon receiving requests for the services from any of the client devices 105. The term "service" as used herein includes the supplying or providing of information over a network (e.g., the network 120), and is also referred to as a communications network service. Examples of services include 5G broadband services, any voice, data or video service provided over a network, smart-grid network, digital telephone service, cellular service, Internet Protocol television (IPTV), Voice Over Long-Term Evolution (VOLTE), Voice Over Internet Protocol (VOIP), Over-The-Top (OTT), etc.

As the service providers 110 provide or transmit data in communication sessions to the client devices 105, the data processing system 115 may intercept or otherwise monitor control plane signaling data (e.g., control plane signaling data packets) or other types of data associated with the communication sessions. Thus, the data processing system 115 may be configured to collect data associated with the communications occurring over the network 120, store the collected data, and/or analyze the collected data. More specifically, the data processing system 115 may detect (e.g., based on the collected data) that a failure condition has occurred. The data processing system 115 may also analyze the collected data to identify the error codes indicative of the failure condition and analyze the error codes to identify correlations therebetween. Based on the identified correlations, the data processing system 115 may determine the specific error codes that likely caused the failure condition. By identifying the error codes that caused the failure condition, the data processing system 115 enables effective troubleshooting of the failure condition, as well as allows resolving of the failure condition effectively and quickly.

To collect data from the network 120, the data processing system may include a network interface 125 connected to the network. The network interface 125 may be any suitable network interface that allows the data processing system 115 to intercept data being transmitted across the network 120 and collect that data. In some embodiments, the network interface 125 may be connected to a network equipment manufacturer (NEM) trace port of the network 120. In other embodiments, the data processing system 115 may be connected to the network 120 in other ways. The data processing system 115 may also communicate with any of the client devices 105 and/or the service providers 110 via the network interface 125.

The data processing system 115 may also include a processor 130 and a memory 135. The processor 130 may be or include an ASIC, one or more FPGAs, a DSP, circuits containing one or more processing components, circuitry for supporting a microprocessor, a group of processing components, or other suitable electronic processing components. In some embodiments, the processor 130 may execute computer code or modules (e.g., executable code, object code, source code, script code, machine code, computer-readable instructions, etc.) stored in the memory 135 to facilitate the operations described herein. The memory 135 may be any volatile or non-volatile computer-readable storage medium capable of storing data or computer code.

The memory 135 may store computer-readable instructions to implement a data collector 140, a database 145, a condition detector 150, a condition analyzer 155, and an exporter 160. The memory 135 may include computer-readable instructions for implementing other functionality described herein. The data collector 140, the condition detector 150, the condition analyzer 155, and the exporter 160 may collect data associated with the network 120 at different periods of time and store the data in the database 145. The data that is collected may be associated with different states of operation of the network 120 (e.g., a normal state of operation, a good state of operation, an anomalous or failed state of operation). The data collector 140, the condition detector 150, the condition analyzer 155, and the exporter 160 may detect (e.g., determine, generate, calculate) an indication of a failure condition on the network 120, identify the error codes associated with the failure condition, and analyze the identified error codes to determine the error code that may be a root cause of the failure condition.

The data collector 140 may include programmable instructions that, upon execution, cause the processor 130 to obtain or collect data (e.g., control plane signaling data packets) from the network 120. In some cases, the collected data may be associated with various metrics. For example, the data may be associated with communications relationships, network traffic rates and composition, source counts and distribution, queries/sec, packet sizes, and routing table entries, among other observable and quantifiable network attributes. The metrics may include packet level metrics (e.g., classless inter-domain routing (CIDR), autonomous system number (ASN), Geographical information, time-to-live (TTL), packet sizes in and out), application metrics (e.g., various DNS, hypertext transfer protocol (HTTP), and session initiation protocol (SIP) fields and values), traffic metrics (e.g., network traffic analysis, client traffic analysis), and service responses (e.g., network metrics, application response times), among other metrics associated with the network 120. In some embodiments, the metrics may include response status codes (e.g., HTTP status codes) indicative of a status of the communication occurring over the network 120. The response status codes may be issued by the service providers 110 in response to requests by the client devices 105. In some embodiments, the response status codes may be indicative of a status of the communication between the client devices 105 and the service providers 110.

In some embodiments, the response status codes may be a numeric code (e.g., a three-digit number) indicative of the status. Among other types, the response status codes may include error codes (also referred to herein as failure codes). These error codes may indicate that a client request cannot be fulfilled (e.g., because of a bad syntax or another reason), and therefore indicates a failure condition. The error codes may indicate that the service providers 110 failed to service the client request for some reason, which may also be indicative of a failure condition. The error codes may be indicative of other types of failure conditions. In general, a failure condition may include any anomalous condition that prevents or reduces performance beyond acceptable levels of a communication between the client devices 105 and the service providers 110.

In some embodiments, the data collector 140 may collect the data continuously. For example, the data collector 140 may collect the data at discrete time intervals, periodically, aperiodically, or in response to an event (e.g., a trigger). The data collector 140 may generate a set of metrics based on the collected data being collected at a time interval (e.g., during a time period). The data collector 140 may generate a respective set of metrics for each time data is collected. The data collector 140 may store (e.g., record) the data and/or the sets of metrics in the database 145.

The database 145 may be a database (e.g., relational, non-relational, object oriented) that stores the sets of metrics/data and associated time-period data, among other potential data. In some cases, the data collector 140 may store such data from multiple communication sessions between different nodes with identifiers to distinguish between the communication sessions. In some embodiments, the data collector 140 may store the data in another memory instead of the database 145. The data collector 140, the processor 130, and/or another component of the memory 135 may retrieve data from the database 145 to analyze the network 120, determine failure conditions, and identify causes of the failure conditions, among other uses.

The condition detector 150 may include programmable instructions that, upon execution, cause the processor 130 to detect anomalies such as failure conditions that occur on the network 120. In some cases, the condition detector 150 may analyze the collected data (e.g., metrics) to identify the failure condition. The condition detector 150 may also identify the error codes associated with the identified failure condition. The condition analyzer 155 may include programmable instructions that, upon execution, cause the processor 130 to analyze the identified error codes and determine the cause of the failure condition. The exporter 160 may include executable instructions that, upon execution by the processor 130, may prepare and send messages indicative of the identified cause of the failure condition. For example, the exporter 160 may generate a message that may include information of the error codes that are likely the cause of the failure condition, error group information, and any other information (e.g., troubleshooting information, etc.) that may be desired or considered useful to have. The exporter 160 may send the message to the data processing system 115, the service providers 110, the client devices 105, and/or another computing device. For example, the exporter 134 may create an exportable file (e.g., a file with a format such as BIL, GRD/TAB, PNG, ASKII, KMZ, etc.) from the generated data and transmit the exportable file to the computing device for display. The exporter 160 may transmit the exportable file to the computing device responsive to a request from the computing device. In some embodiments, the exporter 160 may generate and/or export exportable files to the computing device at set intervals to provide the computing device with real-time updates of the performance of communication sessions between nodes. In some cases, the exporter 134 may export the generated data by streaming the generated data or sending the generated data via a log output, among other various forms of transferring data.

Although the data collector 140, the condition detector 150, the condition analyzer 155, and the exporter 160 are shown as separate components, in some embodiments, one or more of those components may be combined together and the combined component may perform the functions of the individual components that were combined. Although not shown, the client devices 105 and the service providers 110 may also include one or more processors that execute computer-readable instructions stored in one or more memories. The data processing system 115 may include other or additional elements to perform the functions described herein.

The network 120 may be a telecommunications network and may include computer networks such as the Internet, local, wide, metro, or other area networks, intranets, satellite networks, and other communication networks such as voice or data mobile telephone networks. The network 120 may be used to access information resources such as web pages, web sites, domain names, or uniform resource locators that may be presented, output, rendered, or displayed on at least one computing device (e.g., client device 105). For example, via the network 120, the client devices 105 may stream videos in video sessions provided by service providers 110 or otherwise communicate with the servers of the service providers 110 for data. In some embodiments, network 120 may be or include a self-organizing network that implements a machine learning model to automatically adjust connections and configurations of network elements of network 120 to optimize network connections (e.g., minimize latency, reduce dropped calls, increase data rate, increase quality of service, etc.).

Each of the client devices 105, the service providers 110, and/or the data processing system 115 may include or utilize at least one processing unit or other logic device such as programmable logic array engine, or module configured to communicate with one another or other resources or databases. The components of the client devices 105, the service providers 110, and/or the data processing system 115 may be separate components or a single component. The system 100 and its components may include hardware elements, such as one or more processors, logic devices, or circuits.

FIG. 2 is an example flow chart of a process 200 for error code analytics in a telecommunications network. The process 200 may be implemented by a controller or a processor (e.g., of the data processing system 115, the client devices, 105 and/or the service providers 110). The process 200 may include more or fewer operations and the operations may be performed in any order. Performance of the process 200 may enable the processor to collect data associated with different time intervals of a network (e.g., the network 120).

The process 200 includes operation 205 of detecting, by the processor, a failure condition on the network 120. In some embodiments, the processor may detect the failure condition based on the collected data from the network 120. For example, in some embodiments, the processor may determine from the collected data if the response status codes include any error codes. In some embodiments, the error codes may begin with a particular digit (e.g., 4 or 5). In other embodiments, the error codes may be identified in other ways. Presence of the error codes in the response status codes may be indicative of a failure condition. In some embodiments, the processors may identify a failure condition in other ways.

The process 200 includes operation 210 of identifying, by the processor, a subset of subscribers that are impacted by the failure condition. In some embodiments, a subscriber may be a client device (e.g., the client devices 105). In some embodiments, a subscriber may be a service provider (e.g., the service providers 110). In some embodiments, the processor may identify the subset of subscribers impacted by the failure condition based on the collected data. For example, in some embodiments, the collected data may include, in addition to the response status codes, data (e.g., identity data, location data, etc.) regarding the originator (e.g., the client device 105) of the request, recipient (e.g., the service provider 110) of the request, the originator (e.g., the service provider) of the response, the recipient (e.g., the client device) of the response, and any other suitable information. The processor may identify all subscribers that are associated with the failure condition (e.g., identify the subscribers whose communication sessions generated a particular one or more error codes). From all the subscribers, the processor may identify the subset of subscribers. In some embodiments, the subset of subscribers may be based on a threshold number of subscribers. For example, in some embodiments, the processor may be configured to identify top 100 subscribers that are experiencing the failure condition. If the total number of subscribers identified are greater than the threshold number of subscribers, in some embodiments, the processor may determine a subset of the subscribers.

The subscribers that are selected to be in the subset may be based on one or more predefined criteria. For example, in some embodiments, the criteria may be based on a time-period that a subscriber experienced the failure condition. Subscribers that experienced the failure condition more recently (e.g., within a predetermined period of time) may be selected. In some embodiments, the criteria may be based on a number of error codes identified for a particular subscriber. For example, the processor may be configured to select the subscribers that generated greater than a predetermined number of error codes. In some embodiments, other, additional, or combination of criteria may be used. The processor may also identify a time window within which the failure condition is detected and from which the subset of subscribers are identified.

Figure 3:
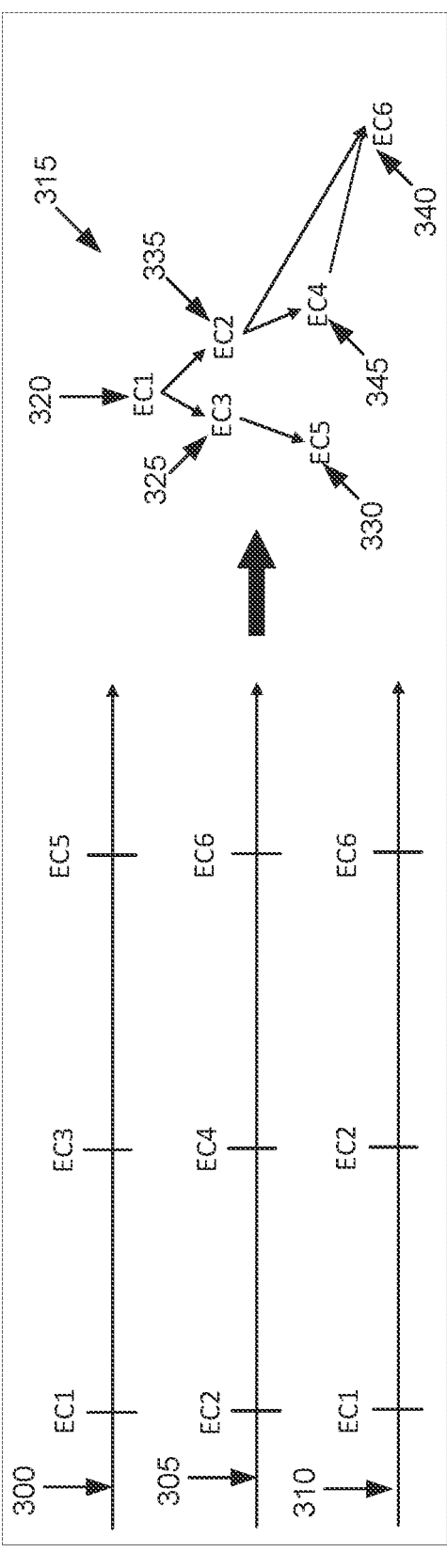
FIG. 3 is an example Bayesian graph generated during the process of FIG. 2.

Responsive to identifying the subset of subscribers, the processor, at operation 215, determines a first set of error codes for the failure condition for each subscriber in the subset. The first set of error codes may be error codes that are generated in the time window. In some embodiments, each subscriber may generate different error codes for the same failure condition depending on the protocol and/or network interface used for the communication. The processor may also determine a timeline of the first set of error codes for each subscriber. Example timelines are shown in FIG. 3. Referring to FIG. 3 in conjunction with FIG. 2, first, second, and third timelines 300, 305, 310, respectively are shown. Each timeline is associated with a subscriber. For example, the first timeline 300 may be associated with a first subscriber, the second timeline 305 may be associated with a second subscriber, and the third timeline 310 may be associated with a third subscriber. The first, second, and third subscribers may be part of the subset of subscribers identified at the operation 210. Each of the timelines 300-310 may correspond to the same time window. Although each of the timelines 300-315 shows three error codes (EC1-EC6), in some embodiments, one or more of the timelines may include greater than or fewer than three error codes in the time window. Further, three timelines are shown only as an example. The number of timelines may correspond to the number of subscribers in the subset of subscribers.

The arrow on each of the timelines 300-310 indicates the progression of time. Thus, the right side of the timeline represents a more recent time than the left side of the timeline. The first timeline 300 shows that error code EC1 was generated followed by error code EC3 and then EC5. In some embodiments, this may be indicative of the error code EC5 to be caused by the error code EC3, which in turn may have been caused by the error code EC1. The second timeline 305 shows that the error code EC2 generated followed by error codes EC4 and EC6. Thus, the error code EC6 may have been caused by the error code EC4, which in turn may have been caused by the error code EC2. The third timeline 310 shows that the error code EC1 was followed by error code EC2 and then EC6, indicating that the error code EC6 may have been caused by the error code EC2 which in turn may have been caused by the error code EC1. The first set of error codes may include EC1, EC3, EC5 for the first subscriber, EC2, EC4, and EC6 for the second subscriber, and EC1, EC2, and EC6 for the third subscriber.

Turning back to FIG. 2, at operation 220 the processor creates a Bayesian network from the first set of error codes of the operation 215. A Bayesian network is a probabilistic graphical model that includes a plurality of nodes connected based on dependencies or correlations between the nodes. In some embodiments, the Bayesian network may be a Directed Acyclic Graph (DAG). In other words, a Bayesian network may not include loops. Each node of the Bayesian network may be associated with one or more of the first set of error codes. In some embodiments, a single Bayesian network may be created from the first set of error codes of each of the subset of subscribers. An example of a Bayesian network 315 is shown in FIG. 3. The Bayesian network 315 is created based on the error codes in the timelines 300-310. The Bayesian network 315 includes a plurality of nodes 320-345. Each of the plurality of nodes 320-345 is associated with one or more error codes from the timelines 300-310. The plurality of nodes 320-345 are connected based on the sequence in which the error codes are generated on a particular timeline.

For example, the first timeline 300 indicates that error code EC1 led to error code EC3 which led to error code EC5. The Bayesian network 315 reflects this relationship in the nodes 320, 325, and 330 such that the node 320 (EC1) leads to the node 325 (EC3) (e.g., the direction of the arrow goes from the node 320 towards the node 325), and the node 325 leads to the node 330 (EC5). The third timeline 310 shows that the error code EC1 leads to error code EC2, which leads to error code EC6. This relationship is reflected in the Bayesian network 315 through the node 320 (EC1) leading to the node 335 (EC2), which leads to the node 340 (EC6). The second timeline 305 shows that the error code EC2 leads to error code EC4, which leads to error code EC6. This relationship is reflected in the Bayesian network 315 through the node 335 (EC2) leading to the node 345 (EC4), which leads to the node 340 (EC6). Thus, the Bayesian network 315 is created based on the error codes (e.g., the first set of error codes) in the timelines 300-310. For each timeline that is generated, the Bayesian network 315 is updated to include that timeline. The direction of the arrows in the Bayesian network 315 indicates which error code is correlated with which error code. For example, the link between the nodes 320 and 325 points to the node 325 indicating that the error code EC3 is caused by the error code EC1 associated with the node 320, and so on.

Going back to FIG. 2, at operation 225, the Bayesian network (e.g., the Bayesian network 315) created at the operation 220 is updated. The updating of the Bayesian network 315, in some embodiments, may be optional. By updating the Bayesian network 315, the correlations between the error codes may be more accurately identified. In some embodiments, the Bayesian network 315 is a DAG such that loops between nodes are not allowed. Thus, the Bayesian network created at the operation 220 may be analyzed to identify any nodes that form a loop. Those nodes may then be combined together. Although the Bayesian network 315 does not include any loops, an example of a loop may be where EC1→EC2 and EC2→EC1 such that EC1 and EC2 form a loop. Another example of a loop may be EC1→EC2→EC3 and EC3→EC1 such that EC1 and EC3 form a loop. In such cases, the nodes that form a loop may be combined into a single node. For example, if EC1 (the node 320) and EC2 (the node 335) were to be combined if they formed a loop (e.g., because a connection back from the node 335 to the node 320 existed), the connection between the nodes 320 and 335 may be deleted and the node 320 may represent both EC1 and EC2. The nodes 340 and 345 may then be connected directly to the node 320. The connection between the nodes 345 to the node 340 may remain after the loop is removed. Similarly, if EC1 and EC3 are combined, the respective nodes of those error codes may be combined such that the combined node includes both error codes EC1 and EC3. In this manner, each node of the Bayesian network may include one or more error codes.

The error codes of each node in the Bayesian network may be considered correlated but without a causation relationship. In other words, the error codes of a node may not be caused by each other. For example, if error codes EC1 and EC2 are combined into a single node, the error code EC1 may not be considered to cause EC2 and the error code EC2 may not be considered to cause error code EC1. By removing loops from the Bayesian network, the size of the Bayesian network may be reduced, thereby increasing processing performance of the Bayesian network in further processing described below.

Figure 4:
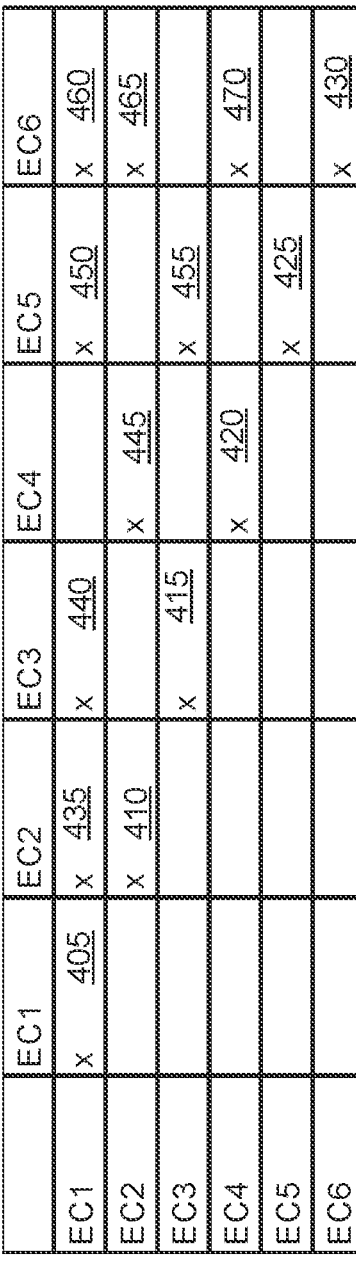
FIG. 4 is an example correlation matrix generated during the process of FIG. 2.

In some embodiments, the Bayesian network 315 may be updated using a correlation matrix. An example of a correlation matrix 400 is shown in FIG. 4. The correlation matrix 400 may be created based on a third set of error codes associated with the network 120. The correlation matrix 400 may identify correlations between the third set of error codes. The correlations in the correlation matrix 400 may be used to update the Bayesian network. To create the correlation matrix 400, a correlation coefficient between each error code in the third set of error codes and remaining error codes in the third set of error codes is computed. The computed correlation coefficient is compared to a predetermined threshold (e.g., 0.9). If the correlation coefficient for a pair of error codes is greater than the predetermined threshold, the error codes in the pair of error codes are considered to be correlated. The correlated error codes may then be used to create the correlation matrix 400.

The correlation matrix 400 may be created outside of and/or during the failure condition. In some embodiments, the processor may identify the third set of error codes per control plane protocol and per network interface that may be generated on the network 120. As indicated above, each network protocol may be associated with its own set of error codes. Each network interface type may be associated with its own set of error codes. Each control plane protocol may be associated with its own set of error codes. The processor may identify all such error codes and determine correlations between the error codes. The third set of error codes may or may not be the same as the first set of error codes. Specifically, if the third set of error codes are collected from the time window from only the subset of subscribers when the failure condition is detected, the third set of error codes and the first set of error codes may be the same. However, if the third set of error codes are collected within the time window of the failure condition but from all subscribers (including the subset of subscribers), outside of the time window during the failure condition, and/or collected outside of the failure condition (or associated with previous failure conditions), the third set of error codes may be different from the first set of error codes.

Simply as an example and without intending to be limiting in any way, let's say six error codes EC1-EC6 are collected. The error codes EC1-EC6 used in this example may or may not be the same as the error codes EC1-EC6 of FIG. 3. The processor may compute a correlation coefficient of error code EC1 with each of the error codes EC2-EC6. The processor may also compute a correlation coefficient of error code EC2 with each of error codes EC1 and EC3-EC6. The processor may compute a correlation coefficient of error code EC3 with each of error codes EC1, EC2, and EC4-EC6, and so on for each of the remaining error codes EC4-EC6 as well. The correlation coefficient may measure the direction and strength of a relationship between two variables. For example, the correlation coefficient between EC1 and EC2 may determine whether EC1 causes EC2 or whether EC2 causes EC1 and the value of the computed correlated coefficient between those error codes may determine the strength of the correlation between those error codes. In some embodiments, the correlation coefficient may have a value between a negative one and a positive one (−1 to +1). A correlation coefficient that is closer to positive one indicates a stronger relationship between the associated error codes while a correlation coefficient closer to negative one indicates a weaker relationship between the associated error codes.

In some embodiments, the processor may compute the correlation coefficients between two error codes using the following formula Equation 1:

$$r = n\left(\sum xy\right) - \left(\sum x\right)\left(\sum y\right) / \sqrt{\left[n\sum x2 - \left(\sum x\right)2\right]\left[n\sum y2 - \left(\sum y\right)2\right]}$$

In the Equation 1 above:
r=correlation coefficient
x=first error code
y=second error code
n=total number of values of x or y in the data collected
Σx=Sum of all values for first variable (x)

Σy=Sum of all values for second variable (y)

Σxy=Sum of product of first and second variables

Σx2=Sum of squares of the first value (x)

Σy2=Sum of squares of the second value (y)

In other embodiments, the processor may compute the correlation coefficient in other ways. Upon computing the correlation coefficient of each error code in the third set of error codes with the remaining error codes in the third set of error codes, the processor may compare the computed correlation coefficients of each pair of error codes with the predetermined threshold (e.g., 0.9). For example, the processor may compare the correlation coefficient between error codes EC1 and EC2 with the predetermined threshold, the correlation coefficient between error codes EC1 and EC3 with the predetermined threshold, and so on. All pairs of error codes whose value of the correlation coefficient is greater than the predetermined threshold are said to be highly correlated. Using the information of the highly correlated error codes, the correlation matrix 400 may be created.

Continuing with the example of using the error codes EC1-EC6, the correlation matrix 400 includes six main rows and six main columns, one row and one column for each error code. An "X" mark on a block indicates that the error code on a particular column is highly correlated with the error code on the associated row. An error code is always highly correlated with itself. Thus, block 405 indicates that EC1 is highly correlated to itself, block 410 indicates that EC2 is highly correlated to itself, block 415 indicates that EC3 is highly correlated to itself, block 420 indicates that EC4 is highly correlated to itself, block 425 indicates that EC5 is highly correlated to itself, and block 430 indicates that EC6 is highly correlated to itself. The correlation matrix 400 also indicates in block 435 that the error code EC2 is highly correlated to error code EC1 (although because there is no "X" in the row associated with EC2 and the column associated with EC1, the error code EC1 is not highly correlated to error code EC2). Block 440 indicates that the error code EC3 is highly correlated to error code EC1, block 445 indicates that the error code EC4 is highly correlated to error code EC2, blocks 450 and 455 indicate that the error code EC5 is highly correlated to error codes EC1 and EC3, respectively, and blocks 460, 465, and 465 indicate that the error code EC6 is highly correlated to error codes EC1, EC2, and EC4, respectively. The "highly correlated" pairs of error codes may all have a correlation coefficient that is higher than the predetermined threshold. If a first error code (e.g., EC1) is highly correlated to a second error code (e.g., EC2), this may indicate that the second error code (e.g., EC2) may be caused by the first error code (e.g., EC1) or generation of the first error code (e.g., EC1) may lead to generation of the second error code (e.g., EC2).

The correlation matrix 400 may be used to update the Bayesian network 315. In particular, the correlation matrix 400 may be used as a filter to prevent the Bayesian network 315 from growing too big and increasing latency and reducing performance. Error codes that are not present in the correlation matrix 400 may not be added to, or removed from, the Bayesian network 315. Thus, updating the Bayesian network 315 may include removing connections or links between nodes that are not highly correlated. For example, and assuming that the error codes ECX1-EC6 on the correlation matrix 400 are same as the error codes EC1-EC6 in the Bayesian network 315, the Bayesian network 315 shows a connection or link between the node 320 (EC1) and the node 325 (EC3). However, the correlation matrix 400 indicates that EC1 is not highly correlated to EC3 (e.g., there is no "X" in the row associated with EC3 and the column associated with EC1). Therefore, the Bayesian network 315 may be updated by deleting the link or connection between the nodes 320 and 325. By updating the Bayesian network using the correlation matrix 400, the further processing of the Bayesian network may be improved.

Figure 5:
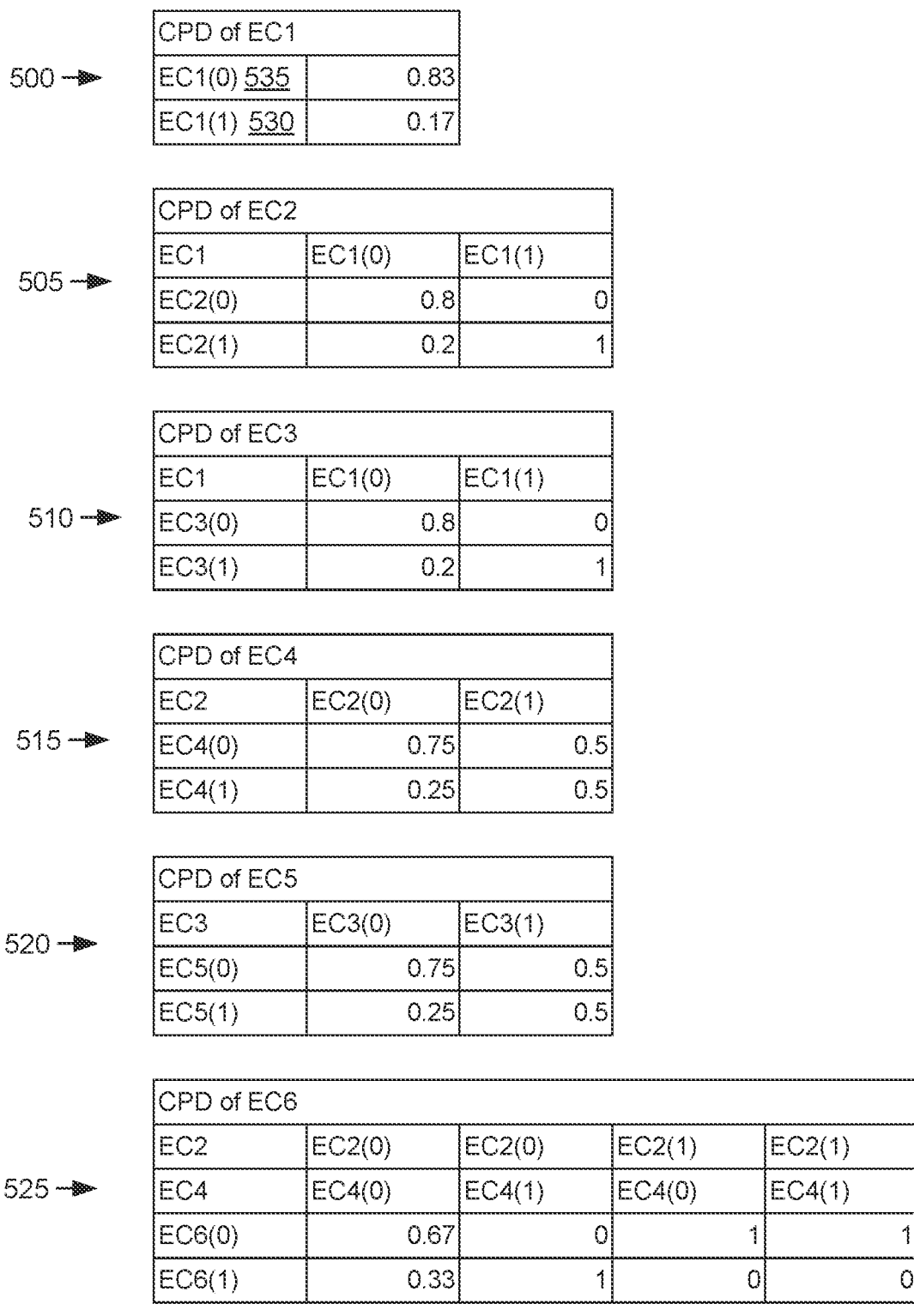
FIG. 5 is an example Conditional Probability Distribution generated during the process of FIG. 2.

Turning back to FIG. 2, at operation 230, the processor computes a Conditional Probability Distribution (CPD) for each node of the Bayesian network 315. In particular, the processor computes the CPD for each error code of each node of the Bayesian network 315. As the Bayesian network is updated, the CPD may also be updated. The CPD indicates the likelihood that an error code is caused by another error code. Using the Bayesian network 315 as an example, and referring to FIG. 5, the processor may compute a first CPD 500 for the node 320, a second CPD 505 for the node 335, a third CPD 510 for the node 325, a fourth CPD 515 for the node 345, a fifth CPD 520 for the node 330, and a sixth CPD 525 for the node 340. Since the error code EC1 associated with the node 320 is not caused by any other error code (e.g., there is no parent node of the node 320), the first CPD 500 only includes the CPD for the error code EC1. The first CPD 500 includes a first value 530 (EC1(1)) indicating the probability that EC1 is the cause of the failure condition and a second value 535 (EC1(0)) indicating the probability that EC1 is not the cause of the failure condition. Since the second value 535 is higher than the first value 520, the first CPD 500 indicates that the likelihood that the error code EC1 is the cause of the failure event is low.

Each of the second-sixth CPD 505-525 includes a CPD between a particular node and its immediate parent node. For example, the second CPD 505 shows the CPD between the error code EC2 of the node 335 and the error code EC1 of the node 320 (since EC2 is caused by EC1). The second CPD 505 indicates the probability of EC2 being caused by EC1. In particular, the second EPD 505 indicates the probability of EC1 not occurring when the error code EC2 occurs or not. EC2(0) and EC1(0) are indicative of the error code EC2 and EC1, respectively, not occurring and EC2(1) and EC1(1) are indicative of the error codes EC2 and EC1, respectively, occurring. The second CPD 505 shows that the probability that EC2 occurs (EC2(1)) when EC1 also occurs (EC1(1)) is one (e.g., very high), the probability that EC2 occurs (EC2(1)) when EC1 does not occur (EC1(0)) is 0.2 (e.g., very low), the probability that EC2 does not occur (EC2(0)) when EC1 also occurs (EC1(1)) is zero (e.g., unlikely), and the probability that EC2 does not occur (EC2(0)) when EC1 also does not occur (EC1(0)) is 0.8 (e.g., high).

Likewise, the third CPD 510 shows the CPD between the error code EC3 of the node 325 and the error code EC1 of the node 320 (since the Bayesian network indicates that EC3 is caused by EC1). The third CPD 510 shows that the probability that EC3 occurs (EC3(1)) when EC1 also occurs (EC1(1)) is one (e.g., very high), the probability that EC3 occurs (EC3(1)) when EC1 does not occur (EC1(0)) is 0.2 (e.g., very low), the probability that EC3 does not occur (EC3(0)) when EC1 also occurs (EC1(1)) is zero (e.g., unlikely), and the probability that EC3 does not occur (EC3(0)) when EC1 also does not occur (EC1(0)) is 0.8 (e.g., high). Similarly, the fourth CPD 515 shows the CPD between the error code EC4 of the node 345 and the error code EC2 of the node 335 (since the Bayesian network 315 indicates that EC4 is caused by EC2). The fourth CPD 515 shows that the probability that EC4 occurs (EC4(1)) when EC2 also occurs (EC2(1)) is half (e.g., somewhat high), the probability that EC4 occurs (EC4(1)) when EC2 does not occur (EC2(0)) is 0.25 (e.g., somewhat low), the probability that EC4 does not occur (EC4(0)) when EC2 also occurs (EC2(1)) is half (e.g., somewhat high), and the probability that EC4 does not occur (EC4(0)) when EC2 also does not occur (EC2(0)) is 0.75 (e.g., high).

The fifth CPD 520 shows the CPD between the error code EC5 of the node 330 and the error code EC3 of the node 325 (since the Bayesian network 315 indicates that EC5 is caused by EC3). The fifth CPD 520 shows that the probability that EC5 occurs (EC5(1)) when EC3 also occurs (EC3(1)) is half (e.g., somewhat high), the probability that EC5 occurs (EC5(1)) when EC3 does not occur (EC2(0)) is 0.25 (e.g., somewhat low), the probability that EC5 does not occur (EC5(0)) when EC3 occurs (EC3(1)) is half (e.g., somewhat high), and the probability that EC5 does not occur (EC5(0)) when EC3 also does not occur (EC3(0)) is 0.75 (e.g., high). The sixth CPD 525 shows the CPD between the error code EC6 of the node 340 and the error codes EC2 of the node 335 and the error code EC4 of the node 345 (since the Bayesian network 315 indicates that EC6 is caused by both EC2 and EC4). The sixth CPD 525 shows that the probability that EC6 occurs (EC6(1)) when EC2 and EC4 both occur (EC2(1), EC4(1)) is zero (e.g., unlikely), the probability that EC6 occurs (EC6(1)) when EC2 occurs but EC4 does not occur (EC2(1) and EC4(0)) is zero (e.g., unlikely), the probability that EC6 occurs (EC6(1)) when EC2 does not occur but EC4 occurs (EC2(0) and EC4(1)) is one (e.g., highly likely), the probability that EC6 occurs (EC6(1)) when EC2 does not occur and EC4 also does not occur (EC2(0) and EC4(0)) is 0.33 (e.g., low), the probability that EC6 does not occur (EC6(0)) when both EC2 and EC4 occur (EC2(1) and EC4(1)) is one (e.g., highly likely), the probability that EC6 does not occur (EC6(0)) when EC2 occurs and EC4 does not occur (EC2(1) and EC4(0)) is one (e.g., highly likely), the probability that EC6 does not occur (EC6(0)) when EC2 does not occur and EC4 occurs (EC2(0) and EC4(1)) is zero (e.g., unlikely), and the probability that EC6 does not occur (EC6(0)) when both EC2 and EC4 do not occur (EC2(0) and EC4(0)) is 0.67 (e.g., high).

Thus, by looking at the CPD, the correlations between the various error codes may be determined. In some embodiments, CPD may be computed using Equation 2 below:

$$pX|Y(x|y) = P(\{X = x\} \cap \{Y = y\})P(Y = y) = p(x, y)pY(y),$$

provided that $$pY(y) > 0.$$

In the Equation 2 above:
pX|Y(x|y) is the CPD of error codes X and Y
x, y are the values that X and Y can take
In other embodiments, the processor may compute the CPD of each node in the Bayesian network 315 in other ways. The processor then uses the CPD at operation 235 of FIG. 2 to identify a second set of error codes that are indicative of a cause of the failure condition of the operation 205. For a given failure condition, for each contributing error code, the processor may ask the Bayesian network 315 what error codes are involved and review the CPD of those nodes and chain up the other error codes that lead to the failure condition. For example, the second and the third timelines 305 and 310, respectively, indicate that error code EC6 is the most recently occurring error code. By analyzing the sixth CPD 525 associated with EC6, the processor may determine that the probability of EC6 occurring is highest (e.g., a probability of 1) when the error code EC4 occurs but error code EC2 does not occur. Thus, the processor may determine that the EC6 is caused by EC4. The processor may then analyze the fourth CPD 515 associated with the error code EC4. On analyzing the fourth CPD 515, the processor may determine that the probability of EC4 occurring is high when the error code EC2 also occurs (e.g., probability of 0.5). Thus, the processor may determine that EC4 is caused by EC2. Next, the processor may analyze the second CPD 505 associated with the error code EC2. On analyzing the second CPD 505, the processor may determine that the probability of EC2 occurring is very high when the error code EC1 also occurs (e.g., a probability of 1). Thus, the processor may determine that error code EC2 is caused by the error code EC1. Because EC1 is not caused by any other error code, the processor may determine the following: error code EC6 is caused by error code EC4 (CPD=1.0), error code EC4 is caused by error code EC2 (CPD=0.5), and error code EC2 is caused by error code EC1 (CPD=1.0). Thus, the processor may determine that the event that generated error code EC1 is most likely the root cause of the failure condition. The processor may also determine that by resolving the issue that caused error code EC1, the error codes EC2, EC4, and EC6 may potentially be resolved.

Therefore, by moving up the chain of CPD, the processor may identify the second set of error codes. For example, the second set of error codes in the example above may include error codes EC6, EC4, EC2, and EC1. Similarly, the processor may identify the second set of error codes for the first timeline 300 (e.g., for the error code EC5). The processor may similarly determine the chain of error codes for other error codes in a timeline. Thus, the second set of error codes may be a subset of the first set of error codes for the subset of subscribers combined. In some embodiments, once a failure in one part of the network is detected, the rest of the network may be analyzed for other failures that may be related to or cause the failure based on the impacted subscribers.

Based on the second set of error codes, the processor generates a message at operation 240. The message 240 may include a variety of suitable information. For example, the message may include the second set of error codes. The message may include a natural language construction (e.g., explain the meaning of the second set of error codes in natural language). The message may provide troubleshooting guidance explaining how the error codes may be resolved. The message may be enriched with error group information to provide more context. The message may include other types of information. The processor may present the message to a user (e.g., on the client device 105 and/or the service provider 110 and/or a display of the data processing system 115).

Figure 6A:
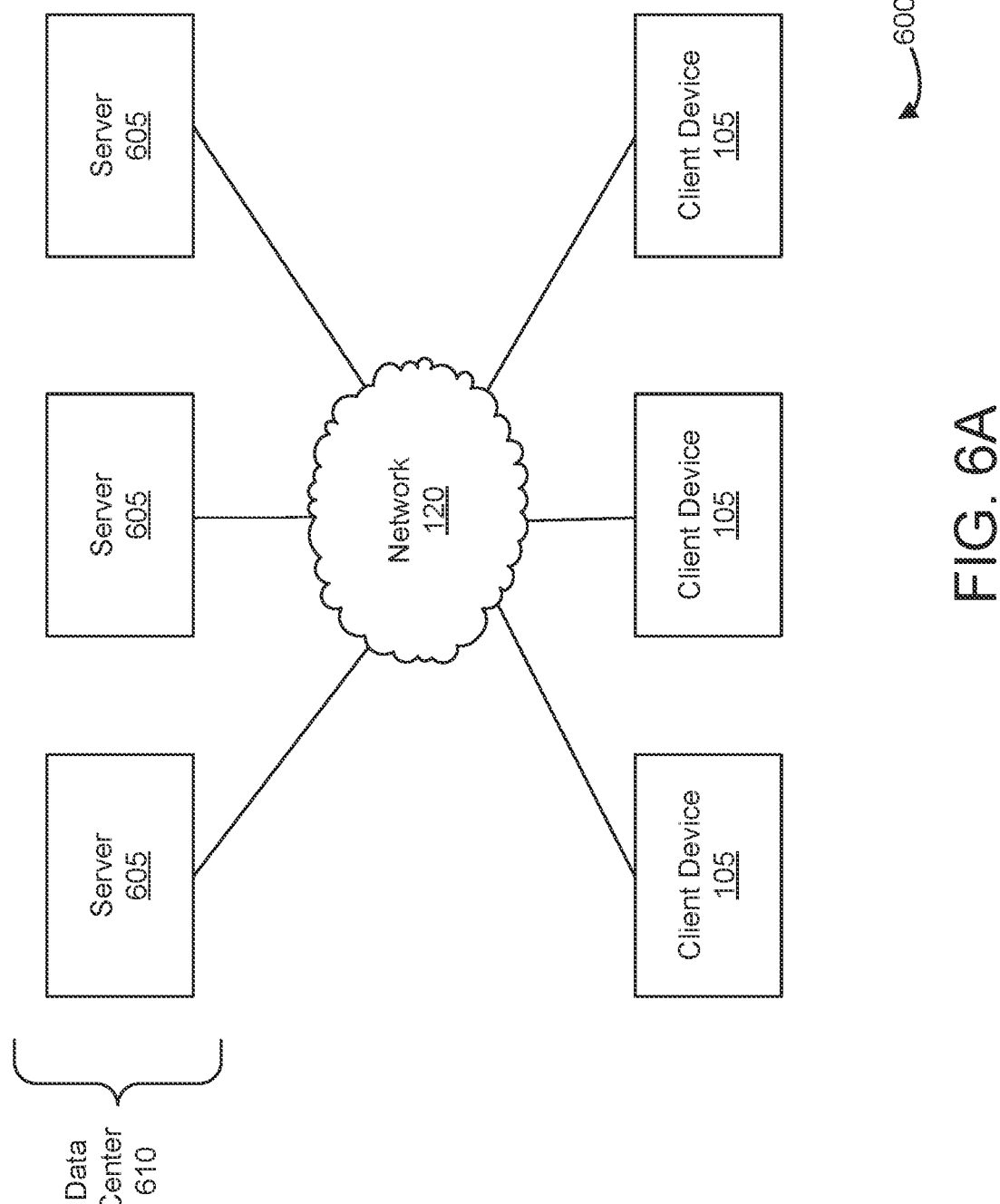
FIG. 6A is an example block diagram depicting an implementation of a network environment including a client device in communication with a server device.

FIG. 6A depicts an example network environment 600 that may be used in connection with the methods and systems described herein. The network environment 500 includes one or more client devices 105 (also generally referred to as clients, client node, client machines, client computers, client computing devices, endpoints, or endpoint nodes) in communication with one or more servers 605 (also generally referred to as servers, nodes, or remote machine) via one or more networks 120. In some embodiments, the client device 105 has the capacity to function as both a client node seeking access to resources provided by a server and as a server providing access to hosted resources for other client devices 105.

Although FIG. 6A shows the network 120 between the client devices 105 and the servers 605, the client devices and the servers may be on the same network 120. In embodiments, there are multiple networks 120 between the client devices 105 and the servers 605. The network 120 may include multiple networks such as a private network and a public network. The network 120 may include multiple private networks. The network 120 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, 4G, 5G or other standards. The network standards may qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 120 may be any type and/or form of network. The geographical scope of the network 120 may vary widely and the network 120 may be a body area network (BAN), a personal area network (PAN), a local-area network (LAN), e.g. Intranet, a metropolitan area network (MAN), a wide area network (WAN), or the Internet. The topology of the network 120 may be of any form and may include, e.g., any of the following: point-to-point, bus, star, ring, mesh, or tree. The network 120 may be an overlay network which is virtual and sits on top of one or more layers of other networks 120. The network 120 may be of any such network topology as known to those ordinarily skilled in the art capable of supporting the operations described herein. The network 120 may utilize different techniques and layers or stacks of protocols, including, e.g., the Ethernet protocol or the internet protocol suite (TCP/IP). The TCP/IP internet protocol suite may include application layer, transport layer, internet layer (including, e.g., IPv6), or the link layer. The network 120 may be a type of a broadcast network, a telecommunications network, a data communication network, or a computer network.

The network environment 600 may include multiple, logically grouped servers 605. The logical group of servers may be referred to as a data center 610 (or server farm or machine farm). In embodiments, the servers 605 may be geographically dispersed. The data center 610 may be administered as a single entity or different entities. The data center 610 may include multiple data centers 508 that may be geographically dispersed. The servers 605 within each data center 610 may be homogeneous or heterogeneous (e.g., one or more of the servers 605 may operate according to one type of operating system platform (e.g., WINDOWS NT, manufactured by Microsoft Corp. of Redmond, Washington), while one or more of the other servers 605 may operate on according to another type of operating system platform (e.g., Unix, Linux, or macOS)). The servers 605 of each data center 610 do not need to be physically proximate to another server. Thus, the group of servers 605 logically grouped as the data center 610 may be interconnected using a network. Management of the data center 610 may be de-centralized. For example, one or more servers 605 may include components, subsystems and modules to support one or more management services for the data center 610.

The server 605 may be a file server, application server, web server, proxy server, appliance, network appliance, gateway, gateway server, virtualization server, deployment server, SSL VPN server, or firewall. In embodiments, the server 502 may be referred to as a remote machine or a node. Multiple nodes may be in the path between any two communicating servers.

Figure 6B:
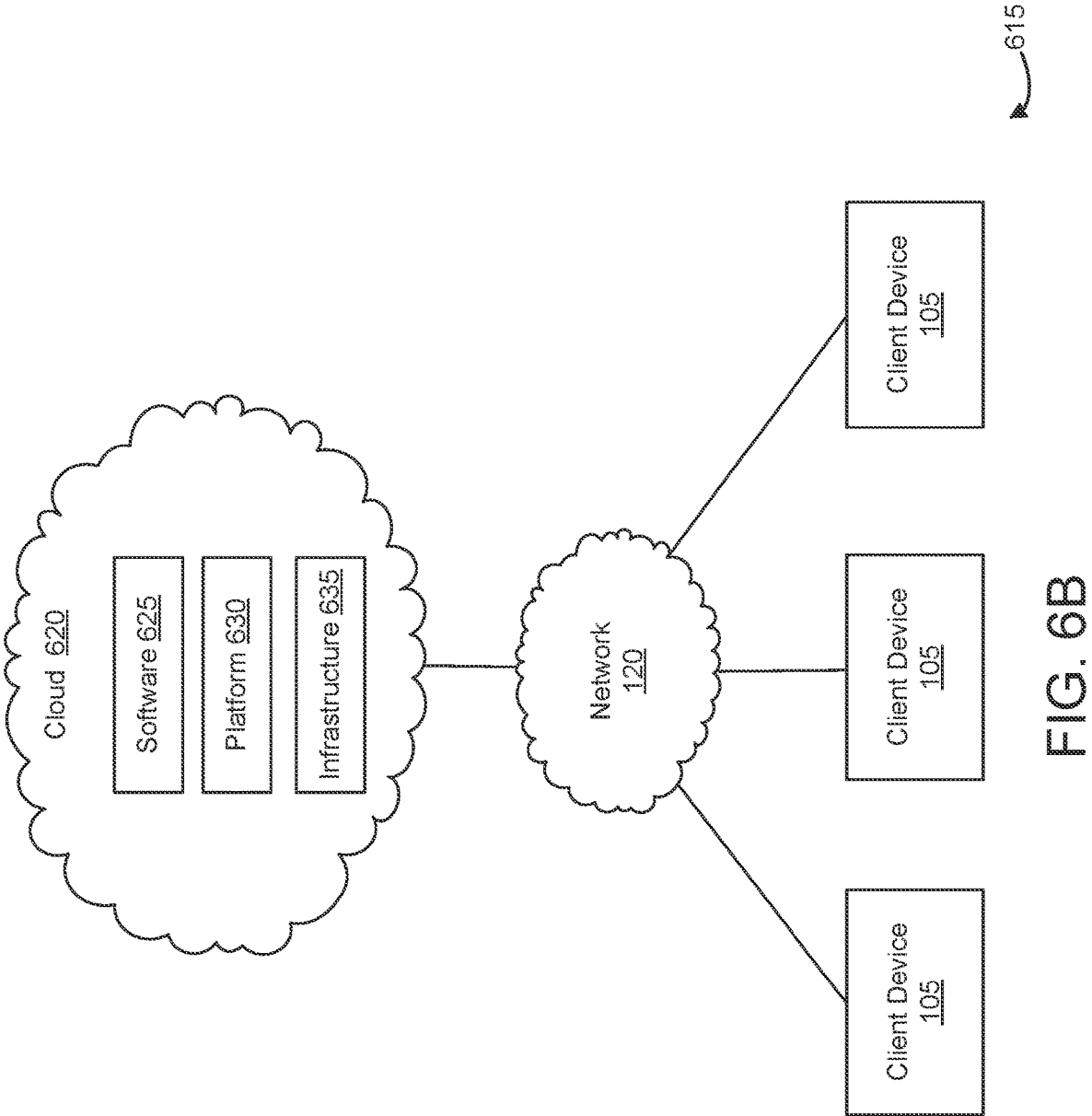
FIG. 6B is an example block diagram depicting a computing environment including a client device in communication with service providers.

FIG. 6B illustrates an example computing environment 615. The computing environment 615 may provide the client device 105 with one or more resources provided by a network environment. The computing environment 615 (e.g., a cloud computing environment, an on-premise computing environment, etc.) may include the client devices 105, in communication with a cloud 620 over one or more of the network 120. The client devices 105 may include, e.g., thick clients, thin clients, zero clients, etc. A thick client may provide at least some functionality even when disconnected from the cloud 620 or the servers 605. A thin client or a zero client may depend on the connection to the cloud 620 or the servers 605 to provide functionality. A zero client may depend on the cloud 620 or the network 120 or the servers 605 to retrieve operating system data for the client devices 105. The cloud 620 may include back-end platforms, e.g., the servers 605, storage, server farms or data centers, etc.

The cloud 620 may be public, private, or hybrid. Public clouds may include public servers (e.g., the servers 605) that may be maintained by third parties to the client devices 105 or the owners of the clients. The servers 605 may be located off-site in remote geographical locations as disclosed above or otherwise. Public clouds may be connected to the servers 605 over a public network. Private clouds may include private servers (e.g., the servers 605) that may be physically maintained by the client devices 105 or owners of clients. Private clouds may be connected to the servers 605 over a private network (e.g., the network 120). Hybrid clouds may include both the private and public networks and the servers 605.

The cloud 620 may also include a cloud-based delivery, e.g., Software as a Service (Saas) 625, Platform as a Service (PaaS) 630, and the Infrastructure as a Service (IaaS) 635. The IaaS 635 may refer to a user renting the use of infrastructure resources that are needed during a specified time period. IaaS providers may offer storage, networking, servers or virtualization resources from large pools, allowing the users to quickly scale up by accessing more resources as needed. The PaaS 630 may offer functionality provided by the IaaS 635, including, e.g., storage, networking, servers or virtualization, as well as additional resources such as, e.g., the operating system, middleware, or runtime resources. The SaaS 625 may offer the resources that the PaaS 630 provides, including storage, networking, servers, virtualization, operating system, middleware, or runtime resources. In some embodiments, the SaaS 625 may offer additional resources including, e.g., data and application resources.

The client devices 105 may access IaaS resources, SaaS resources, or PaaS resources. In embodiments, access to the resources of the IaaS 635, the PaaS 630, or the SaaS 630 may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client device 105 and the servers 605 may be deployed as and/or executed on any type and form of computing device, e.g., a computer, network device or appliance capable of communicating on any type and form of network and performing the operations described herein.

Figure 6C:
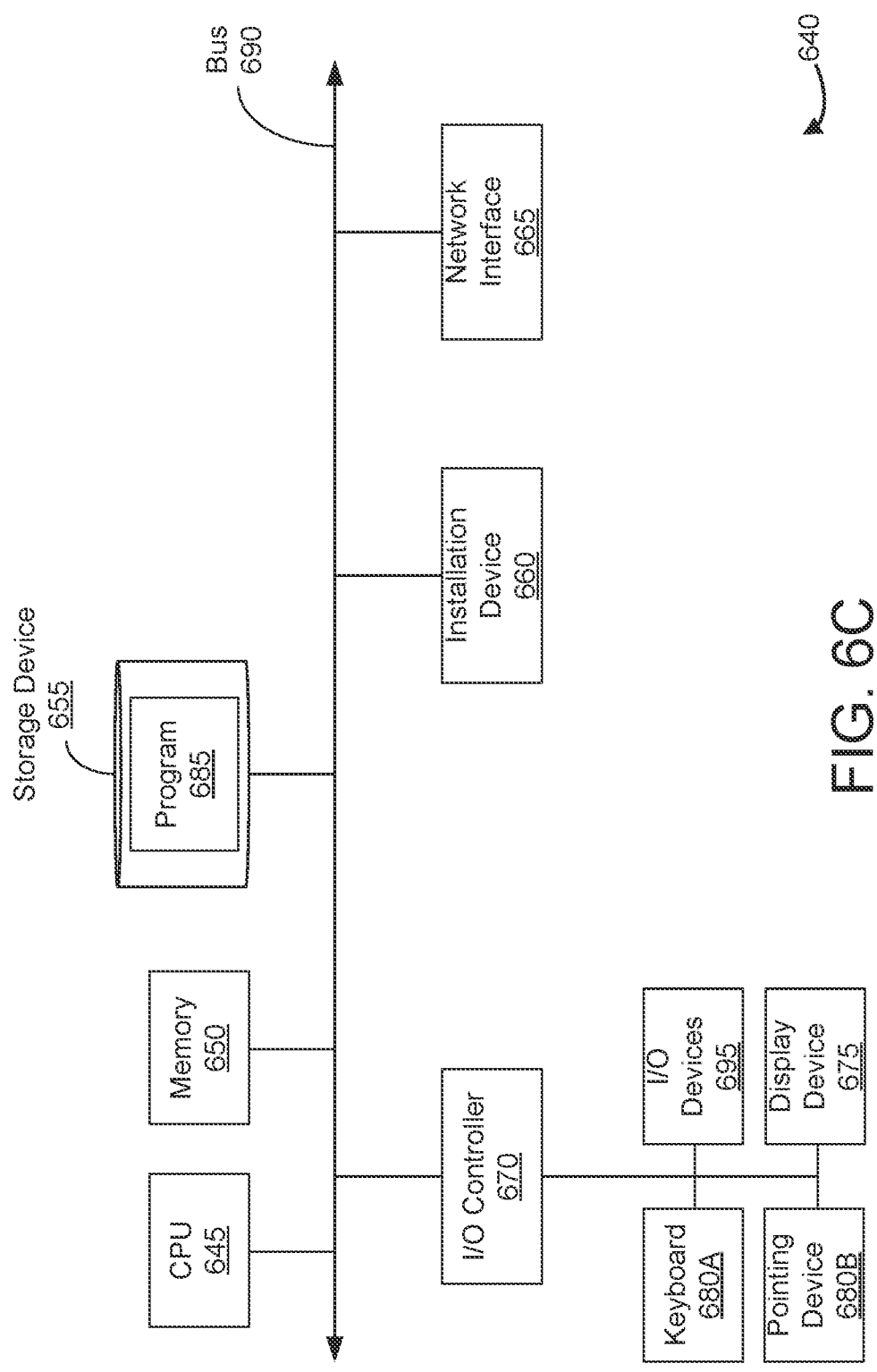
FIG. 6C is an example block diagram depicting an implementation of a computing device that may be used to implement the features of FIGS. 1-5.

FIG. 6C depicts block diagrams of a computing device 640 useful for practicing an embodiment of the client device 105 or the servers 605. As shown in FIG. 6C, the computing device 640 may include a central processing unit 645, and a main memory unit 650. As shown in FIG. 6C, the computing device 640 may include one or more of a storage device 655, an installation device 660, a network interface 665, an I/O controller 670, a display device 675, a keyboard 680A, a pointing device 685B, e.g. a mouse. The storage device 655 may include, without limitation, a program 685, such as an operating system, software, or software associated with the system 100.

The central processing unit 645 may be any logic circuitry that responds to and processes instructions fetched from the main memory unit 650. The central processing unit 645 may be provided by a microprocessor unit, e.g.: those manufactured by Intel Corporation of Mountain View, California. The computing device 640 may be based on any of these processors, or any other processor capable of operating as described herein. The central processing unit 645 may utilize instruction level parallelism, thread level parallelism, different levels of cache, and multi-core processors. A multi-core processor may include two or more processing units on a single computing component.

The main memory unit 650 may include one or more memory chips capable of storing data and allowing any storage location to be directly accessed by the central processing unit 645. The main memory unit 650 may be volatile and faster than the memory associated with the storage device 655. The main memory unit 650 may be Dynamic random-access memory (DRAM) or any variants, including static random-access memory (SRAM). The main memory unit 650 or the storage device 655 may be non-volatile, e.g., non-volatile read access memory (NVRAM). The main memory unit 650 may be based on any type of memory chip, or any other available memory chips. In the example depicted in FIG. 6C, the central processing unit 645 may communicate with the main memory unit 650 via a system bus 690.

A wide variety of I/O devices 695 may be present in the computing device 640. The input devices may include keyboards, mice, trackpads, trackballs, touchpads, touch mice, multi-touch touchpads and touch mice, microphones, multi-array microphones, drawing tablets, cameras, or other sensors. Output devices may include video displays, graphical displays, speakers, headphones, or printers. The I/O devices 695 may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some of the I/O devices 695, the display devices 675 or group of devices may be augmented reality devices. The I/O devices 695 may be controlled by the I/O controller 670. The I/O controller 670 may control one or more of the I/O devices 695, such as, e.g., the keyboard 680A and the pointing device 680B, e.g., a mouse or optical pen. Furthermore, an I/O device may also provide storage and/or the installation device 660 for the computing device 640. In embodiments, the computing device 640 may provide USB connections (not shown) to receive handheld USB storage devices. In embodiments, the I/O devices 695 may be a bridge between the system bus 690 and an external communication bus, e.g. a USB bus, a SCSI bus, a FireWire bus, an Ethernet bus, a Gigabit Ethernet bus, a Fibre Channel bus, or a Thunderbolt bus.

In embodiments, the display device 675 may be connected to the I/O controller 670. The display device 675 may include, e.g., liquid crystal displays (LCD), electronic papers (e-ink) displays, flexile displays, light emitting diode displays (LED), or other types of displays. In some embodiments, the display device 675 or the corresponding I/O controller 670 may be controlled through or have hardware support for OPENGL or DIRECTX API or other graphics libraries. Any of the I/O devices 695 and/or the I/O controller 670 may include any type and/or form of suitable hardware, software, or combination of hardware and software to support, enable or provide for the connection and use of one or more the display device 675 by the computing device 640. For example, the computing device 640 may include any type and/or form of video adapter, video card, driver, and/or library to interface, communicate, connect or otherwise use the display device 675. In embodiments, a video adapter may include multiple connectors to interface to multiple display device 675.

The computing device 640 may include the storage device 655 (e.g., one or more hard disk drives or redundant arrays of independent disks) for storing an operating system or other related software, and for storing application software programs (e.g., the program 685) such as any program related to the systems, methods, components, modules, elements, or functions depicted herein. Examples of the storage device 655 may include, e.g., hard disk drive (HDD); optical drive including CD drive, DVD drive, or BLU-RAY drive; solid-state drive (SSD); USB flash drive; or any other device suitable for storing data. The storage device 655 may include multiple volatile and non-volatile memories, including, e.g., solid state hybrid drives that combine hard disks with solid state cache. The storage device 655 may be non-volatile, mutable, or read-only. The storage device 655 may be internal and connect to the computing device 640 via the bus 690. The storage device 655 may be external and connect to the computing device 640 via the I/O devices 695. The storage device 655 may connect to the computing device 640 via the network interface 665 over the network 120. Some client devices 105 may not require a non-volatile storage device (e.g., the storage device 655) and may be thin clients or zero client devices 105. The storage device 655 may be used as the installation device 660 and may be suitable for installing software and programs.

The computing device 640 may include the network interface 665 to interface to the network 120 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections may be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 640 may communicate with other computing devices via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 665 may include a built-in network adapter, network interface card, PCMCIA network card, EXPRESSCARD network card, card bus network adapter, wireless network adapter, USB network adapter, modem or any other device suitable for interfacing the computing device 640 to any type of network capable of communication and performing the operations described herein.

The computing device 640 may operate under the control of an operating system, which controls scheduling of tasks and access to system resources. The computing device 640 may be running any operating system configured for any type of computing device, including, for example, a desktop operating system, a mobile device operating system, a tablet operating system, or a smartphone operating system. The computing device 640 may be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 640 has sufficient processor power and memory capacity to perform the operations described herein. In some embodiments, the computing device 640 may have different processors, operating systems, and input devices consistent with the device.

In embodiments, the status of one or more devices (e.g., the client devices 105, the servers 605, the service providers 110, etc.) in the network 120 may be monitored as part of network management. In embodiments, the status of a device may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics may be applied at least in part towards decisions in load distribution, network traffic management, and network failure recovery as well as any aspects of operations of the present solution described herein.

The processes, systems and methods described herein may be implemented by the computing device 640 in response to the central processing unit 645 executing an arrangement of instructions contained in the main memory unit 650. Such instructions may be read into the main memory unit 650 from another computer-readable medium, such as the storage device 655. Execution of the arrangement of instructions contained in main memory unit 650 causes the computing device 640 to perform the illustrative processes described herein. One or more processors in a multi-processing arrangement may also be employed to execute the instructions contained in main memory unit 650. Hard-wired circuitry may be used in place of or in combination with software instructions together with the systems and methods described herein. Systems and methods described herein are not limited to any specific combination of hardware circuitry and software.

Although an example computing system has been described in FIGS. 6A-6C, the subject matter including the operations described in this specification may be implemented in other types of digital electronic circuitry, or in computer software, firmware, or hardware, including the structures disclosed in this specification and their structural equivalents, or in combinations of one or more of them.

In some aspects, a method is disclosed. The method includes detecting, by one or more processors, a failure condition on a network, identifying, by the one or more processors, a subset of subscribers impacted by the failure condition, determining, by the one or more processors, for each subscriber in the subset of subscribers a first set of error codes associated with the failure condition, creating, by the one or more processors, a Bayesian network comprising one or more error codes from the first set of error codes of each the subset of subscribers, computing, by the one or more processors, a Conditional Probability Distribution (CPD) for each of the one or more error codes of the Bayesian network, and determining, by the one or more processors, a second set of error codes based on the CPD, the second set of error codes indicative of a cause of the failure condition.

In some other aspects, a system is disclosed. The system includes one or more memories having computer-readable instructions stored thereon and one or more processors that execute the computer-readable instructions to detect a failure condition on a network, identify a subset of subscribers impacted by the failure condition, determine for each subscriber in the subset of subscribers a first set of error codes associated with the failure condition, create a Bayesian network comprising one or more error codes from the first set of error codes of each the subset of subscribers, compute a Conditional Probability Distribution (CPD) for each of the one or more error codes of the Bayesian network, and determine a second set of error codes based on the CPD, the second set of error codes indicative of a cause of the failure condition.

In some other aspects, a non-transitory computer-readable media comprising computer-readable instructions stored thereon is disclosed. The computer-readable instructions when executed by one or more processors, cause the one or more processors to detect a failure condition on a network, identify a subset of subscribers impacted by the failure condition, determine for each subscriber in the subset of subscribers a first set of error codes associated with the failure condition, create a Bayesian network comprising one or more error codes from the first set of error codes of each the subset of subscribers, compute a Conditional Probability Distribution (CPD) for each of the one or more error codes of the Bayesian network, and determine a second set of error codes based on the CPD, the second set of error codes indicative of a cause of the failure condition.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification may be implemented in digital electronic circuitry, or in computer software, firmware, or hardware, including the structures disclosed in this specification and their structural equivalents, or in combinations of one or more of them. The subject matter described in this specification may be implemented as one or more computer programs, e.g., one or more circuits of computer program instructions, encoded on one or more computer storage media for execution by, or to control the operation of, data processing apparatuses. A computer storage medium may be, or be included in, a computer-readable storage device, a computer-readable storage substrate, a random or serial access memory array or device, or a combination of one or more of them. While a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). The operations described in this specification may be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus may include special purpose logic circuitry, e.g., an FPGA (field programmable gate array) or an ASIC (application specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, app, script, or code) may be written in any form of programming language, including compiled or interpreted languages, declarative or procedural languages, and may be deployed in any form, including as a stand-alone program or as a module, component, subroutine, object, or other unit suitable for use in a computing environment. A computer program may correspond to a file in a file system. A computer program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs (e.g., components of the probe 105 or the data processing system 115) to perform actions by operating on input data and generating output. The processes and logic flows may also be performed by, and apparatuses may also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory may be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein may be performed in a different order. The separation of various system components does not require separation in all implementations, and the described program components may be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" may include only 'A', only 'B', as well as both 'A' and 'B'. Such references used in conjunction with "comprising" or other open terminology may include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

detecting, by one or more processors, a failure condition on a network;

identifying, by the one or more processors, a subset of subscribers impacted by the failure condition;

determining, by the one or more processors, for each subscriber in the subset of subscribers a first set of error codes associated with the failure condition;

creating, by the one or more processors, a Bayesian network comprising one or more error codes from the first set of error codes of each subscriber in the subset of subscribers;

accessing, by the one or more processors, a correlation matrix which indicates a plurality of correlations within a third set of error codes, wherein at least one error code of the first set of error codes is included in the third set of error codes, and wherein respective correlations of the plurality of correlations identify particular error codes within the third set of error codes that cause other particular error codes within the third set of error codes based on computed correlation coefficients;

wherein the plurality of correlations are determined based on computing, by the one or more processors, a correlation coefficient between each error code in the third set of error codes and remaining error codes in the third set of error codes, wherein the correlation matrix is created based on each correlation coefficient, the correlation matrix identifying which error codes in the third set of error codes are correlated, wherein the correlation matrix identifies error code-to-error code causation relationships, and wherein error codes having a correlation coefficient greater than a predetermined threshold are identified as correlated;

identifying, by the one or more processors, using the correlation matrix, a first correlation of the plurality of correlations that relates one or more error codes in the third set of error codes to the at least one error code of the first set of error codes;

determining, by the one or more processors, a second set of error codes from the third set of error codes based on the first correlation; and resolving, by the one or more processors, at least one of the failure condition or the first set of error codes by addressing one or more error codes of the second set of error codes.

2. The method of claim 1, further comprising:

determining, by the one or more processors, the third set of error codes associated with the network; and filtering, by the one or more processors, the Bayesian network based on the correlation matrix.

3. The method of claim 2, wherein the Bayesian network comprises a plurality of nodes, the plurality of nodes comprising a first node having a connection to a second node, the first node is associated with a first error code and the second node is associated with a second error code, and wherein filtering the Bayesian network comprises:

determining, by the one or more processors, from the correlation matrix that the first error code is not correlated to the second error code; and deleting, by the one or more processors, the connection between the first node and the second node.

4. The method of claim 1, further comprising:

updating, by the one or more processors, the Bayesian network upon creation, wherein updating the Bayesian network comprises:

identifying, by the one or more processors, at least one node in the Bayesian network that is part of a loop in the Bayesian network; and combining, by the one or more processors, each of the at least one node that is part of the loop into a single node.

5. The method of claim 1, further comprising:

generating, by the one or more processors, a message comprising the second set of error codes;

enriching, by the one or more processors, the message with error group information to obtain an enriched message; and presenting, by the one or more processors, the enriched message to a user.

6. The method of claim 1, wherein the failure condition is a first failure condition that occurs in a first part of the network, wherein the second set of error codes are associated with a second failure condition in a second part of the network, and wherein the second set of error codes are related to, or cause, the first failure condition based on the subset of subscribers.

7. A system, comprising:

one or more memories having computer-readable instructions stored thereon; and one or more processors that execute the computer-readable instructions to:

detect a failure condition on a network;

identify a subset of subscribers impacted by the failure condition;

determine for each subscriber in the subset of subscribers a first set of error codes associated with the failure condition;

create a Bayesian network comprising one or more error codes from the first set of error codes of each subscriber in the subset of subscribers;

access a correlation matrix which indicates a plurality of correlations within a third set of error codes, wherein at least one error code of the first set of error codes is included in the third set of error codes, and wherein respective correlations of the plurality of correlations identify particular error codes within the third set of error codes that cause other particular error codes within the third set of error codes based on computed correlation coefficients;

wherein the plurality of correlations are determined based on computing a correlation coefficient between each error code in the third set of error codes and remaining error codes in the third set of error codes, wherein the correlation matrix is created based on each correlation coefficient, the correlation matrix identifying which error codes in the third set of error codes are correlated, wherein the correlation matrix identifies error code-to-error code causation relationships, and wherein error codes having a correlation coefficient greater than a predetermined threshold are identified as correlated;

identify, using the correlation matrix, a first correlation of the plurality of correlations that relates one or more error codes in the third set of error codes to the at least one error code of the first set of error codes;

determine a second set of error codes from the third set of error codes based on the first correlation; and resolve at least one of the failure condition or the first set of error codes by addressing one or more error codes of the second set of error codes.

8. The system of claim 7, wherein the one or more processors further execute the computer-readable instructions to:

determine the third set of error codes associated with the network;

determine correlations within the third set of error codes by computing correlation coefficients between error codes within the third set of error codes; and update the Bayesian network based on the correlations.

9. The system of claim 8, wherein the Bayesian network comprises a plurality of nodes, the plurality of nodes comprising a first node having a connection to a second node, the first node is associated with a first error code and the second node is associated with a second error code, and wherein to update the Bayesian network, the one or more processors further execute the computer-readable instructions to:

determine from the correlation matrix that the first error code is not correlated to the second error code; and delete the connection between the first node and the second node.

10. The system of claim 7, wherein the one or more processors further execute the computer-readable instructions to:

update the Bayesian network upon creation, wherein updating the Bayesian network comprises:

identify at least one node in the Bayesian network that is part of a loop in the Bayesian network; and combine each of the at least one node that is part of the loop into a single node.

11. The system of claim 7, wherein the one or more processors further execute the computer-readable instructions to:

generate a message comprising the second set of error codes;

enrich the message with error group information to obtain an enriched message; and present the enriched message to a user.

12. A non-transitory computer-readable media comprising computer-readable instructions stored thereon that, when executed by one or more processors, cause the one or more processors to:

detect a failure condition on a network;

identify a subset of subscribers impacted by the failure condition;

determine for each subscriber in the subset of subscribers a first set of error codes associated with the failure condition;

create a Bayesian network comprising one or more error codes from the first set of error codes of each subscriber in the subset of subscribers;

access a correlation matrix which indicates a plurality of correlations within a third set of error codes, wherein at least one error code of the first set of error codes is included in the third set of error codes, and wherein respective correlations of the plurality of correlations identify particular error codes within the third set of error codes that cause other particular error codes within the third set of error codes based on computed correlation coefficients;

wherein the plurality of correlations are determined based on computing a correlation coefficient between each error code in the third set of error codes and remaining error codes in the third set of error codes, wherein the correlation matrix is created based on each correlation coefficient, the correlation matrix identifying which error codes in the third set of error codes are correlated, wherein the correlation matrix identifies error code-to-error code causation relationships, and wherein error codes having a correlation coefficient greater than a predetermined threshold are identified as correlated;

identify, using the correlation matrix, a first correlation of the plurality of correlations that relates one or more error codes in the third set of error codes to the at least one error code of the first set of error codes;

determine a second set of error codes from the third set of error codes based on the first correlation; and resolve at least one of the failure condition or the first set of error codes by addressing one or more error codes of the second set of error codes.

13. The non-transitory computer-readable media of claim 12, wherein the one or more processors further execute the computer-readable instructions to:

determine the third set of error codes associated with the network;

determine correlations within the third set of error codes by computing correlation coefficients between error codes within the third set of error codes; and update the Bayesian network based on the correlations.

14. The non-transitory computer-readable media of claim 13, wherein the Bayesian network comprises a plurality of nodes, the plurality of nodes comprising a first node having a connection to a second node, the first node is associated with a first error code and the second node is associated with a second error code, and wherein to update the Bayesian network, the one or more processors further execute the computer-readable instructions to:

determine from the correlation matrix that the first error code is not correlated to the second error code; and delete the connection between the first node and the second node.

15. The non-transitory computer-readable media of claim 12, wherein the one or more processors further execute the computer-readable instructions to:

update the Bayesian network upon creation, wherein updating the Bayesian network comprises:

identify at least one node in the Bayesian network that is part of a loop in the Bayesian network; and combine each of the at least one node that is part of the loop into a single node.

16. The non-transitory computer-readable media of claim 12, wherein the one or more processors further execute the computer-readable instructions to:

generate a message comprising the second set of error codes;

enrich the message with error group information to obtain an enriched message; and present the enriched message to a user.

\* \* \* \* \*